United States Patent [19]

Miyashita et al.

[11] 3,935,002

[45] Jan. 27, 1976

[54] METHOD OF BLAST FURNACE OPERATION UTILIZING SELECTIVE RECYCLING OF PERIPHERAL GAS STREAM

[75] Inventors: Tsuneo Miyashita; Hiroaki Nishio, both of Kawasaki, Japan

[73] Assignee: Nippon Kokan Kabushiki Kaisha, Tokyo, Japan

[22] Filed: Apr. 3, 1974

[21] Appl. No.: 457,720

[52] U.S. Cl. .................................................. 75/42
[51] Int. Cl.² ......................................... C21B 5/06
[58] Field of Search ................................. 75/41, 42

[56] References Cited
UNITED STATES PATENTS
2,793,946   5/1957   Paschal ................................. 75/41

*Primary Examiner*—M. J. Andrews
*Attorney, Agent, or Firm*—Haseltine, Lake & Waters

[57] ABSTRACT

There is provided a method of blast furnace operation utilizing selective recycling of peripheral gas stream wherein the number of outlet ports for peripheral gas stream and the position of the gas outlet ports relative to the inlet ports for reducing gas are optimalized and the content of nitrogen in the recycling gas and the content of nitrogen in the reducing gas to be injected are controlled within the respective predetermined ranges.

2 Claims, 8 Drawing Figures

METHOD OF BLAST FURNACE OPERATION UTILIZING SELECTIVE RECYCLING OF PERIPHERAL GAS STREAM

BACKGROUND OF THE INVENTION

The present invention relates to a method of blast furnace operation utilizing selective recycling of peripheral gas stream wherein the number of outlet ports for peripheral gas stream and the position of the gas outlet ports relative to the inlet ports for reducing gas are optimalized and the content of nitrogen in the recycling gas and the content of nitrogen in the reducing gas to be injected are controlled within the respective predetermined ranges, whereby a blast furnace operation is ensured which is highly efficient and stable. (According to the present invention, what is termed as the peripheral gas stream is defined as a gas stream that flows in an area between the inner wall surface of a blast furnace and a seven-tenths point on the radius extending from the cross-sectional center of the blast furnace to the furnace wall.)

Many different types of recycling processes are known in the art in which the gas taken out from the top of the furnace or the furnace shaft and reformed into a gas suitable for reducing purposes after the necessary treatment, is injected into the blast furnace at the lower level thereof. They include, for example, (a) Wiberg process, (b) Purofer process, (c) the process disclosed in the published Japanese Patent Application (Publication No. 27127/71), (d) Bureau of Mines experiment and (e) Nixon process. However, though the processes of (a) through (c) above utilize the recycling of the furnace gas, the reducing gas is injected into the blast furnace through the ordinary tuyeres and therefore the injection of the gases is effected at a single level. Therefore, these processes do not belong to the prior art techniques to which the improvements according to the present invention pertain, since there is no big difference in nitrogen content between the composition of the gas in the central area of the furnace and that of the gas in the peripheral area of the furnace. As compared with these processes, those of (d) and (e) above are more closely related to the techniques to which the subject matter of the present invention pertains in that the injection of the reformed reducing gas is effected through inlet ports other than the ordinary tuyeres and that two injection levels are utilized. However, in the Bureau of Mines experiment of (d), the waste gas mixed up irrespective of whether the peripheral gas stream or central gas stream, is removed and recycled for the purpose of regulating the temperature of the reducing gas to be injected. On the other hand, the Nixon process of (e) is designed so that the whole quantity of the waste gas is passed through a purifier and a portion of the purified gas is recycled. In these processes, therefore, the so-called peripheral gas stream flowing in the peripheral area of the furnace top or the furnace shaft is not selectively recycled.

In general, while nitrogen contained in the furnace gases serves as a carrier of heat in the process of heat exchange between the gases and the charge, it is inert in the reduction of ore. Therefore, it is desirable that the nitrogen content of the reducing gas should be minimized so far as the heat exchange between the gases and the charge does not have any detrimental effect on the operation of the furnace. Accordingly, it is essential for improved rate of operation and reduction in fuel ratio to minimize the introduction of nitrogen in the injected gas. In the above-mentioned recycling processes using two level injection, however, a gas mainly consisting of air and containing a greater quantity of nitrogen is injected through the ordinary tuyeres at the lower injection level, while a reducing gas having a low nitrogen content is injected through the upper level inlet ports. Consequently, these gases do not completely mix with each other with the result that in the furnace section above the upper level gas inlet ports, the high nitrogen content gas predominates the central area and the low nitrogen content gas predominates the peripheral area. A method of blast furnace operation in which such a low nitrogen content peripheral gas stream is selectively recycled and utilized as a reforming source to produce a reformed reducing gas that suits the desired blast furnace operation, has been proposed in the published Japenese Pat. Application (Publication No. 49671/71) of the Applicant.

The inventors have conducted various researches in the methods of blast furnace operation which utilize recycling of the abovedescribed peripheral gas stream and have discovered that in practising this recycling of peripheral gas stream, there is a certain optimum range with respect to the number of outlet ports for the peripheral gas stream as well as the angular relation between the peripheral gas outlet ports and the inlet ports for reducing gas. Further, it has been found that by controlling the nitrogen content of the peripheral gas to be taken out and that of the reducing gas to be injected within respective predetermined ranges, a satisfactory and stable blast furnace operation could be ensured.

SUMMARY OF THE INVENTION

It is an object of the present invention to provide a method of blast furnace operation of the type in which a reducing gas produced by reforming a mixture of a peripheral gas stream taken out from the top or shaft of a blast furnace and a fresh feed gas is injected into the furnace through reducing gas inlet ports other than the ordinary tuyeres, wherein the peripheral gas stream is taken out through a plurality of outlet ports whose number is determined in accordance with the following equations:

when $$n \leq k \quad m \geq \frac{C/H}{1.45(C/H)+2.7} n$$

and when $$n > k \quad m \geq \frac{C/H}{1.45(C/H)+2.7} k$$

where $$k = 75.2 - 268 \left(\frac{U}{U+V}\right) + 375 \left(\frac{U}{U+V}\right)^2 - 187 \left(\frac{U}{U+V}\right)^3$$

$U/U+V$ = ratio of injected reducing gas quantity (U) to the total gas quantity (U + V) passing through the furnace V = quantity of gas (Nm³/hr) produced from the blast by the combustion of coke and solution loss reaction m = number of outlet ports for peripheral gas stream n = number of inlet ports for reducing gas C/H = ratio by weight of C to H in a fresh feed gas and wherein the outlet ports for peripheral gas stream are positioned relative to the inlet ports for reducing gas in such a manner that there is a predetermined angular relation therebetween established in accordance with the following equation:

$$\theta \leq \left| 2.52 \times 10^4 \left( \frac{U}{n(U+V)} \right)^3 - 4.53 \times 10^3 \left( \frac{U}{n(U+V)} \right)^2 + 2.83 \times 10^2 \left( \frac{U}{n(U+V)} \right) \right|$$

where $\theta$ = angle made between vertical plane formed by peripheral gas stream outlet port and furnace center line and vertical plane formed by reducing gas inlet port and furnace center line (in degrees)

n = number of reducing gas inlet ports

U = injected reducing gas quantity (Nm³/hr)

V = gas quantity (Nm³/hr) produced from the blast by the combustion of coke and solution loss reaction It is another object of the present invention to provide a method of blast furnace operation of the above type wherein in operating the blast furnace with the reducing gas inlet ports numbered and positioned in the manner described above, the value $x$ of % $N_2$ in the gas taken out from the peripheral area of the furnace is controlled within a range given by the following equation:

$$-5 \leq x - \left\{ 72.2 \left( \frac{U}{U+V} \right)^2 - 116 \left( \frac{U}{V} \right) + 52 \right\} \leq 5$$

where
 $0.1 \leq U/(U+V) \leq 0.9$ and the value $y$ of % $N_2$ in the reducing gas injected into the furnace is controlled within a range given by the following equation:

$$-5 \leq y - \left\{ 37.8 \left( \frac{U}{U+V} \right)^2 - 62.9 \left( \frac{U}{U+V} \right) + 32 \right\} \leq 5$$

where
 $0.1 \leq U/(U+V) \leq 0.9$.

BRIEF DESCRIPTION OF THE DRAWING

FIG. 2 is a graph showing the relationship between the number of reducing gas inlet ports and the ratio of the injected reducing gas quantity to the total gas quantity in the furnace, $U/(U+V)$.

FIG. 3 is a schematic diagram of a blast furnace showing an exemplary angular relation between an outlet port for peripheral gas stream and an inlet port for reducing gas.

FIG. 4 is a graph showing an allowable range of angle $\theta$ for the position of the peripheral gas outlet ports.

FIG. 7 is a schematic diagram of an exemplary blast furnace plant used for performing the method of this invention.

DESCRIPTION OF THE PREFERRED EMBODIMENTS

The present invention will now be described in greater detail with reference to the accompanying drawing and the illustrated examples.

Figure 1:
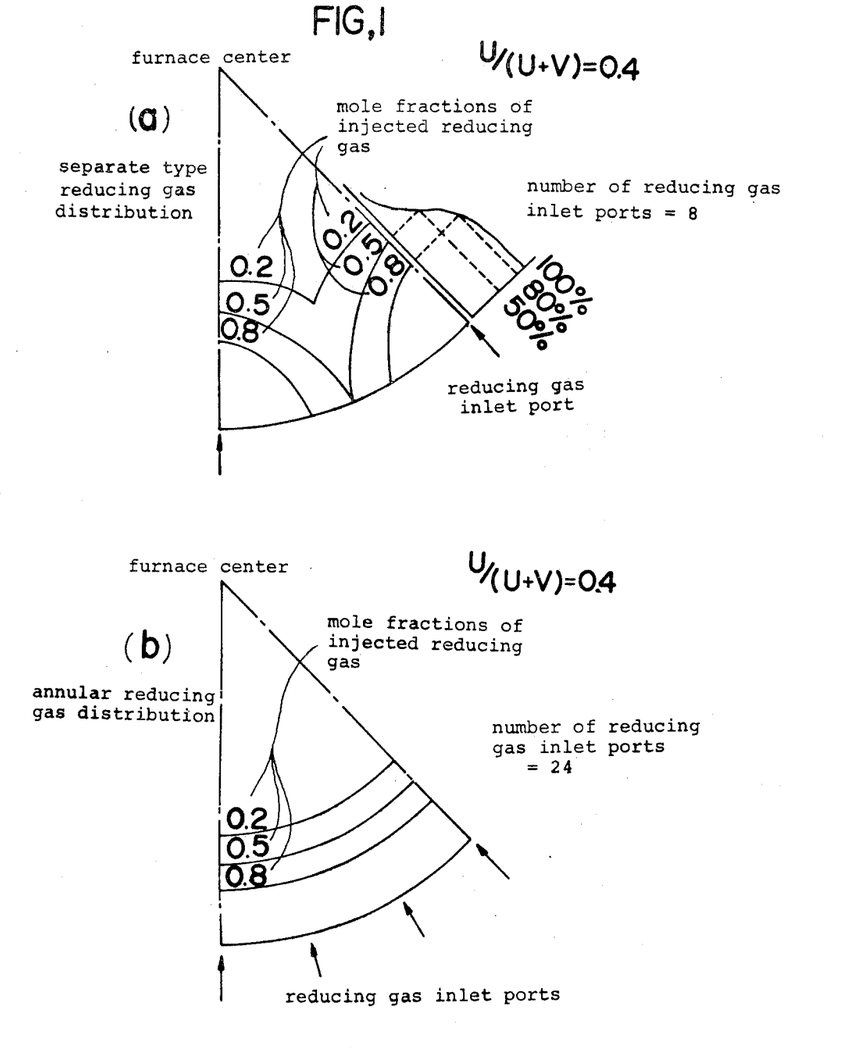
FIG. 1a is a diagram showing the separate type reducing gas distribution in a blast furnace provided with 8 reducing gas inlet ports.
FIG. 1b is a diagram showing the annular reducing gas distribution in a blast furnace provided with 24 (twenty four) reducing gas inlet ports.

The distribution of a reducing gas injected into a blast furnace depends on the quantity of the reducing gas injected and the number of the inlet ports used. For example, in FIG. 1 showing a case where the ratio of the injected reducing gas to the total quantity of the gas passing through a blast furnace, $U/(U+V)$ is 0.4, the distribution of the reducing gas in the upper section of a furnace shaft provided with 8 inlet ports is shown in FIG. 1a, and the similar distribution of the reducing gas in a blast shaft having 24 inlet ports is shown in FIG. 1b. In the case of FIG. 1a, the distribution of the injected reducing gas consists of 8 (eight) separate circles about the respective inlet ports. In the case of FIG. 1b involving 24 inlet ports, the reducing gases injected through the respective inlet ports are joined to form an annular distribution. With these distributions, it will be seen from the separate type reducing gas distribution of FIG. 1a that the reducing gas just above the inlet ports has the highest concentration and the lowest nitrogen content. Therefore, to obtain the recycling gas having a low nitrogen content, the gas near the portion of the charge right above the reducing gas inlet ports must be taken out. On the other hand, the annular distribution of FIG. 1b indicates that the concentration of the reducing gas increases and its value of % $N_2$ decreases in proportion to the distance from the center of the blast furnace. Thus, to obtain the recycling gas with a low value of % $N_2$, it is desirable that the gas in the peripheral area of the furnace be taken out and that the number of outlet ports for the peripheral gas be greater than a certain number.

On the other hand, $CO_2$ and $H_2O$ contained in the taken-out top gas from the peripheral area of the furance react with the hydrocarbon in a fresh feed gas and produces a reducing gas having higher CO and $H_2$ contents which is injected into the blast furnace. As a result, the recycling gas quantity Ur taken out from the peripheral area varies depending on the injected reducing gas quantity U and it also varies depending on the composition of a fresh feed gas to be mixed with the recycling gas during reforming process. As the result of various researches, the inventors have found that in consideration of quality requirements of reducing gas, the taken-out gas quantity Ur is determined so that the following equation which shows the relations of the taken-out gas quantity Ur with the injected quantity U of reducing gas and the ratio C/H (weight ratio) of fresh feed gas is satisfied:

$$U_r = \frac{C/H}{1.45(C/H)+2.7} U \quad (1)$$

If the flow of the taken-out recycling gas is too small as compared with that determined by the above equation, an increased amount of soot will be produced in the reducing gas, whereas an excessive amount of the taken-out recycling gas will increase the amounts of $CO_2$ and $H_2O$ in the reducing gas.

Within the furnace, the injected reducing gas occupies an area which corresponds to the ratio of the injected reducing gas to the total gas quantity, i.e., $U/(U+V)$. For example, if $U/(U+V) = 0.4$ (FIG. 1), then the area determined by the line of 0.5 mole fraction of the reducing gas injected into the furnace approximately corresponds to the ratio $U/(U+V)$, and the concentration of the gas sharply differs between inside and outside of said line. As a result, in order to remove the recycling gas having a low $N_2$ content, it is necessary to take out the recycling gas from the gas stream occupying the area above the inlet ports (in the case of the separate type distribution) or the peripheral area (in the case of the annular distribution) with the ratio of $U/(U+V)$. In the case of the separate type distribution, for example, if inlet ports numbering $n$ are used to inject the quantity $U$, then the flow quantity of reducing gas per inlet port is $U/n$ and thus the maximum quantity of the recycling gas available through each outlet port is $U/n$. On the other hand, if the total quantity of recycling gas to be taken out is determined in accordance with equation (1), then the number $m$ of outlet ports is given by the following equation:

$m \geq U_r/(U/n)$ (2) from equations (1) and (2), we obtain $$m \geq \frac{C/H}{1.45(C/H)+2.7} n \quad (3)$$

Whether the distribution of the reducing gas within the furnace takes the form of a separate type distribution or annular distribution depends on the ratio of the injected reducing gas quantity to the total gas quantity in the furnace, $U/(U+V)$ and the number $n$ of the inlet ports used (FIG. 2). Let $k$ represent the critical number of inlet ports, then the value of $k$ is given by the following equation:

$$k = 75.2 - 268\left(\frac{U}{U+V}\right) + 375\left(\frac{U}{U+V}\right)^2 - 187\left(\frac{U}{U+V}\right)^3 \quad (4)$$

In other words, if the number of inlet ports is smaller than $k$, then the distribution of the reducing gas takes a separate form, whereas if it is greater than $k$, the distribution of the reducing gas takes an annular form. And when computed on the basis of $k$ inlet ports, the number $m$ of outlet ports required for producing a quality reducing gas is given from equation (3), as follows:

$$m \geq \frac{C/H}{1.45(C/H)+2.7} k \quad (5)$$

While the use of inlet ports greater than $k$ results in an annular distribution of the injected reducing gas, no further increase in the number of the inlet ports can change this distribution form. Therefore, in the case of the annular distribution (provided that the number of the inlet ports is greater than $k$), the number of outlet ports must be determined, independently of the number of the inlet ports, to satisfy equation (5) to obtain a quality reducing gas.

If follows from the foregoing that the recycling gas suitable for producing quality reducing gas having a low $N_2$ content can be always obtained if the following condition is satisfied:

If $n \leq k$ (when the distribution of the reducing gas is a separate distribution), the number $m$ of outlet ports for the peripheral gas stream is given as $$m \geq \frac{C/H}{1.45(C/H)+2.7} n$$

or if $n > k$ (when the distribution of the reducing gas is an annular distribution), the number $m$ of outlet ports for the peripheral gas stream is given as $$m \geq \frac{C/H}{1.45(C/H)+2.7} k$$

It has also been discovered by the inventors that even in cases where the gas removed through a number of peripheral gas outlet ports determined in the manner described above was recycled, the quality of the gas thus recycled differed depending on the angular relation between the outlet ports and the inlet ports for reducing gas and that the peripheral gas with improved quality could be taken out by angularly adjusting the relative positions of these inlet and outlet ports. It has been additionally discovered that if the nitrogen content of the peripheral gas to be taken out and that of the reducing gas to be injected were respectively controlled within its predetermined range, a stable and improved blast furnace operation could be ensured.

Generally, the injected reducing gas occupies the peripheral area of the furnace and the gas produced from the blast occupies the central area of the furnace. However, since there occurs mixing by diffusion between these gases, the central gas stream having a higher $N_2$ content is mixed to some extent with the peripheral gas stream of lower $N_2$ content. Where the amount of the injected reducing gas is small, this lowers the effect of reducing $N_2$ content due to the taking-out of the peripheral gas stream. Accordingly, it is desirable that the ratio of the injected reducing gas quantity to the total gas quantity in the furnace, $U/(U+V)$ is greater than 0.1.

On the other hand, the reforming process for producing a reducing gas usually utilizes a reaction that results in an increased volume such as shown below:

$CO_2 + CH_4 \rightarrow 2CO + 2H_2$

The required $CO_2$ is supplied from the recycled top gas and $CH_4$ is contained in a fresh feed gas, e.g., coke-oven gas fed to a reformer furnace. The produced CO and $H_2$ are introduced into the blast furnace as reducing gases. Since the amount of the recycling gas used for reforming process is smaller than the amount of the injected reducing gas, a portion of the injected reducing gas is utilized as the recycling gas and the remainder leaves the furnace as waste gas. As the flow of the reducing gas increases, the ratio of the reducing gas in the central gas stream increases similarly as in the peripheral gas stream with resultant decrease in the $N_2$ content of the central gas stream. If the reducing gas is injected excessively, the difference in $N_2$ content between the central gas stream and the peripheral gas stream decreases and hence the beneficial effect of taking out the peripheral gas stream deteriorates. Therefore, it is desirable that the ratio $U/(U+V)$ be maintained below 0.9.

The composition of the peripheral gas stream is influenced by the position of their outlets on the furnace, and the position of outlet ports through which the peripheral gas of the desired properties can be taken out lies within a range of angles relative to the position of the inlet ports for reducing gas and the center of the furnace. In other words, as shown in FIG. 3, if lines X and X′ are respectively drawn from the center A of the outlet port and the center B of the inlet port toward the center line Y of the blast furnace to produce two imaginary vertical planes including respectively the sides Y and X and the sides Y and X′, in accordance with the finding by the inventors, the peripheral gas stream having the lowest % $N_2$ can be taken out by adjusting the value of an angle $\theta$ formed by the two vertical planes within the range determined by the following equation (6):

$$\theta \leq \left| 2.52 \times 10^4 \left(\frac{U}{n(U+V)}\right)^3 - 4.53 \times 10^3 \left(\frac{U}{n(U+V)}\right)^2 + 2.83 \times 10^2 \left(\frac{U}{n(U+V)}\right) \right| \quad (6)$$

where
$\theta$ is in degrees
U = quantity of reducing gas injected
n = number of inlet ports for reducing gas
V = quantity of gas produced from the blast by the combustion of coke and solution loss reaction The allowable limits of the angle $\theta$ according to equation (6) are shown in the graph of FIG. 4, and it is essential that the value of $\theta$ is controlled and maintained within the range indicated by the hatched area in FIG. 4.

The proper position of the peripheral gas outlet ports in the direction of the height of the blast furnace is in the area between the line higher than ⅓ of the shaft height and near the stock line.

Further, as will be seen from equation (6), the angle $\theta$ is considerably affected by the ratio of the injected reducing gas quantity (U) to the total gas quantity (U+V) and therefore it is desirable that in order to take out the peripheral gas of the desired properties and use it effectively in the operation of the blast furnace, variation in the composition of the injected reducing gas, particularly the variation of $N_2$ content which is detrimental to the reaction within the furnace is minimized to ensure stable operating conditions of the furnace. The composition of the taken-out recycling gas and that of a reducing gas to be injected mutually affect each other and thus any change in the composition of one causes a change in the composition of the other. Consequently, in order to ensure stable operating conditions of the furnace, it is desirable that in addition to taking-out and recycling the peripheral gas stream through a proper number of properly positioned outlet ports, the value of % $N_2(x)$ in the taken-out peripheral gas stream and the value of % $N_2(y)$ in a reducing gas to be injected be controlled respectively within the ranges given by the following equations (7) and (8):

$$-5 \leq x - \left\{72.2 \left(\frac{U}{U+V}\right)^2 - 116 \left(\frac{U}{U+V}\right) + 52\right\} \leq 5 \quad (7)$$

$$-5 \leq y - \left\{37.8 \left(\frac{U}{U+V}\right)^2 - 62.9 \left(\frac{U}{U+V}\right) + 32\right\} \leq 5 \quad (8)$$

where
x = % $N_2$ contained in taken-out peripheral gas stream
y = % $N_2$ contained in reducing gas injected
U = quantity of reducing gas injected
V = quantity of gas produced from the blast by the combustion of coke and solution loss reaction.

Figure 5:
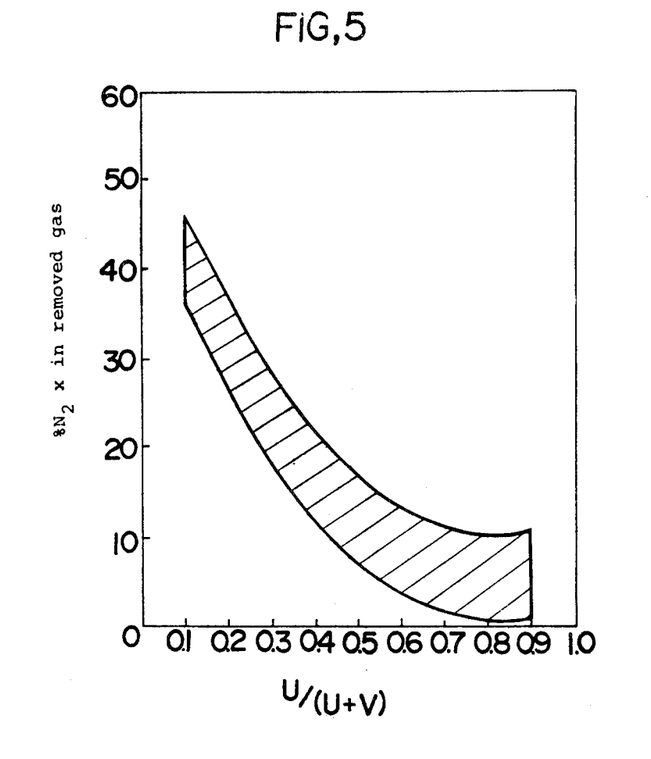
FIG. 5 is a graph showing an optimum range of % $N_2$ ($x$) contained in the gas taken out from the furnace.
Figure 6:
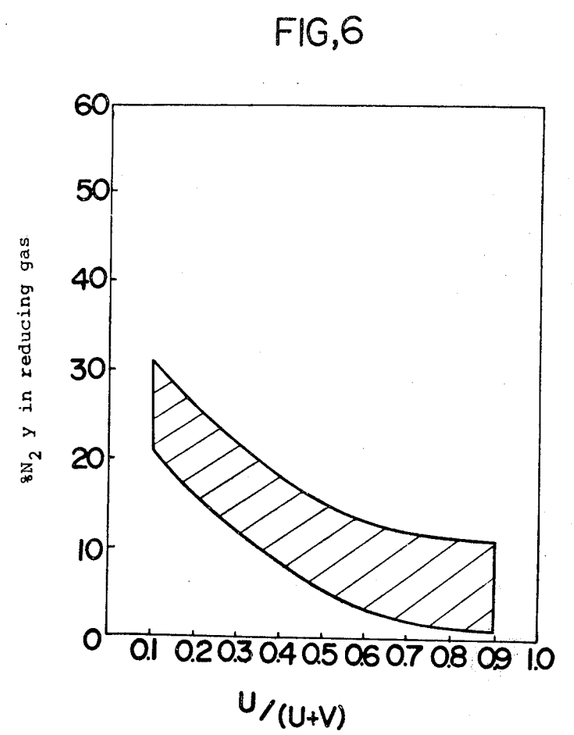
FIG. 6 is a graph showing an optimum range of % of $N_2$ ($y$) contained in the reducing gas to be injected.

FIGS. 5 and 6 show the graphic representations of the above equations (7) and (8), and the hatched portions represent the respective ranges of values to which x and y are to be adjusted.

The following examples describe in greater detail the operation of an exemplary blast furnace plant shown in FIG. 7 in accordance with the novel method of this invention.

Briefly, the blast furnace plant of FIG. 7 was operated as follows. A peripheral gas stream 3 in the upper section of the shaft of a blast furnace 5 was conducted to a demister and dust catcher 7 and the gas 3 freed from dust and water was then preheated up to 1,300°C by a preheater 8. On the other hand, a coke-oven gas 4 as a fresh feed gas was passed to a preheater 9 where it was preheated up to 900°C. The thus preheated gases 3 and 4 were then mixed together and reformed in a reformer furnace 6 and the reformed gas was introduced as a reducing gas 1 into the blast furnace 5 at positions above the tuyeres for an air blast 2. In FIG. 7, numeral 10 designates the top gas which was not recycled.

EXAMPLE 1:

The blast furnace plant shown in FIG. 7 was operated utilizing different numbers of outlet ports for peripheral gas stream. The following Table 1 shows the comparison of the blast furnace operation according to the method of this invention and according to the conventional methods.

Table 1

|  | Separate type reducing gas distribution | | Annular reducing gas distribution | |
| --- | --- | --- | --- | --- |
|  | According to the invention | | According to the invention | |
|  | a | b | c | d |
| Number of reducing gas inlet ports | 8 | 8 | 16 | 16 |
| Number of peripheral gas outlet ports | 3 | 8 | 6 | 16 |
| Blast volume(Nm³/T) | 582 | 574 | 830 | 812 |
| Blast temperature (°C) | 1097 | 1110 | 1100 | 1109 |
| Injected reducing gas volume (Nm³/T) | 533 | 531 | 807 | 794 |
| Reducing gas tempe- | 1181 | 1195 | 1205 | 1189 |

Table 1-continued

|  |  | Separate type reducing gas distribution | | Annular reducing gas distribution | |
|---|---|---|---|---|---|
|  |  | According to the invention | | According to the invention | |
| rature (°C) | | | | | |
| Recycling gas volume (Nm³/T) | | 247 | 249 | 354 | 360 |
| Coke-oven gas volume (Nm³/T) | | 141 | 139 | 201 | 203 |
| Reducing gas composition (%) | CO | 39.9 | 42.6 | 35.6 | 41.9 |
| | $CO_2$ | 8.2 | 9.0 | 7.2 | 8.4 |
| | $H_2$ | 27.9 | 29.6 | 35.1 | 34.0 |
| | $H_2O$ | 6.0 | 4.2 | 7.0 | 4.8 |
| | $N_2$ | 18.0 | 14.6 | 15.1 | 10.9 |
| Taken-out gas composition (%) | CO | 16.2 | 17.6 | 18.7 | 19.6 |
| | $CO_2$ | 19.7 | 16.5 | 16.5 | 14.9 |
| | $H_2$ | 17.2 | 24.0 | 20.2 | 27.8 |
| | $H_2O$ | 14.0 | 18.6 | 16.1 | 22.6 |
| | $N_2$ | 32.9 | 23.3 | 28.5 | 15.1 |
| Coke ratio (kg/T) | | 411 | 398 | 323 | 310 |

In Table 1, letters a and b show the operations with the separate type reducing gas distribution. In the case of b employing reducing gas inlet ports and eight peripheral gas outlet ports, as compared with the operation a employing only three outlet ports, the amount of $N_2$ in the composition of the removed gas was lower by 9.6%, the amount of $N_2$ in the reducing gas composition was lower by 3.4%, and the coke ratio was lower by 13 kg/T. It will thus be seen that the operation of b using eight outlet ports along with eight reducing gas inlet ports, is more effective in reducing the coke ratio as compared with the operation of a.

Letters c and d show the operations with the annular reducing gas distribution. The reducing gas was introduced in an amount corresponding to the ratio $U/(U+V) = 0.41$. In the operation of c, 6 (six) peripheral gas outlet ports were used with 16 reducing gas inlet ports, while 16 peripheral gas outlet ports were used in the operation of d. In the operation of d, as compared with the case of c, the content of $N_2$ in the taken-out gas composition was lower by 13.4%, the content of $N_2$ in the reducing gas was lower by 4.2%, and the coke ratio was lower by 22 kg/T. It will thus be seen that the operation of d employing 16 peripheral gas outlet ports with 16 reducing gas inlet ports has a greater effect in reducing the coke ratio than the operation of c. Thus, it is evident from the above Table 1 that the use of a number of peripheral gas outlet ports as determined according to equation (3) or (5) has a satisfactory effect in reducing the coke ratio of a blast furnace.

EXAMPLE 2:

The blast furnace plant shown in FIG. 7 was operated according to the method of this invention. The peripheral gas outlet ports were positioned according to the teachings of this invention, and the nitrogen content (5) in the peripheral gas taken out and the reducing gas injected were also controlled according to the teachings of this invention. The following Table 2 shows the comparison of the operation according to the invention and according to the conventional methods.

TABLE 2

|  | a | b | c |
|---|---|---|---|
| U/(U+V) | 0.38 | 0.38 | 0.38 |
| U/n(U+V) | 0.095 | 0.095 | 0.095 |
| Θ (degree) | — | 0 | 10 |
| Blast volume (Nm³/T) | 848 | 820 | 831 |
| Blast temperature (°C) | 1098 | 1101 | 1090 |
| Injected reducing gas volume (Nm³/T) | 760 | 758 | 761 |
| Reducing gas temperature (°C) | 1200 | 1196 | 1215 |
| Taken-out recycle gas volume (Nm³/T) | 351 | 355 | 353 |
| Coke-oven gas volume (Nm³/T) | 202 | 199 | 200 |
| Reducing gas composition (%) CO | 27.2 | 42.3 | 34.7 |
| $CO_2$ | 7.3 | 8.5 | 8.0 |
| $H_2$ | 37.3 | 33.1 | 35.0 |
| $H_2O$ | 6.7 | 4.7 | 7.2 |
| $N_2$ | 21.5 | 11.4 | 15.1 |
| Taken-out gas composition (%) CO | 20.1 | 19.4 | 19.0 |
| $CO_2$ | 17.5 | 15.4 | 16.5 |
| $H_2$ | 11.0 | 27.1 | 19.1 |
| $H_2O$ | 11.3 | 22.5 | 16.1 |
| $N_2$ | 40.1 | 15.6 | 29.3 |
| Coke ratio (Kg/T) | 335 | 308 | 321 |

In the above Table 2, letter a shows the operation according to a conventional method in which the top gas was nonselectively taken out and recycled; b the operation according to the method of this invention in which the top gas was taken out and recycled from the peripheral gas stream just above the reducing gas inlet ports ($\theta = 0$) (the $N_2$ content was the lowest); and c the operation in which the top gas was taken out and recycled from the gas stream outside the limits of the $\theta$ and thus outside the range of this invention though it was a peripheral gas stream (the $N_2$ content was higher than in the case of c). In all of these operations, n (the number of reducing gas inlet ports) = 4.

It will be seen from the above Table 2 that in the operation where the reducing gas was injected in an amount corresponding to 38% of the total quantity of the gas passed through the furnace shaft, the following effects were confirmed under the condition that about 200 Nm³/T of coke-oven gas was used as a fresh feed gas for reforming purposes:

1. In the operation of a, the top gas taken out from the top of the shaft had an average composition and its $N_2$ content was as high as 40.1% so that the resultant reducing gas produced according to the above-mentioned conditions would contain 21.5% $N_2$. In this case, the coke ratio was 335 kg/T of pig iron. In other words, this operation is representative of the conventional top gas recycling processes and it was shown in this Table 2 as the standard of comparison.

2. The operation of b was performed in accordance with the method of this invention, and the nitrogen content in the taken-out recycling gas was as low as 15.6%. Consequently, the $N_2$ content in the reducing gas reformed by using the above-mentioned amount of fresh feed gas (coke-oven gas) was 11.4% which was about one half of that in the case of a. As a result, the resultant reducing gas contained CO of particularly high concentration with the result that the indirect reduction within the shaft of the blast furnace was facilitated and the coke ratio was greatly reduced to 308 kg/T.

3. In the operation of c, though the top gas was taken out from the peripheral gas stream, the position of the outlet ports was such that the value of $\theta$ was 10° which was outside the range of $\theta$ as defined according to this invention (in this case, the proper angle would be $\theta \leq 7°$). Therefore, the taken-out recycling gas contained 29.3% $N_2$ and thus the resultant reformed reducing gas also contained 15.1% $N_2$. Consequently, the coke ratio was 321 kg/T.

A comparison between thhe operations *a* and *b* shows that the recycling gas taken out from the peripheral gas stream contained considerably reduced amount of $N_2$ and thus the nitrogen content in the resultant reformed reducing gas was considerably low. Thus, the coke ratio attained with the use of the peripheral gas taken out was lower by 27 kg/T. It will thus be seen that the nitrogen content in a reducing gas has a detrimental effect on coke ratio and the nitrogen content in the reducing gas can be reduced with the use of the taken-out peripheral gas.

It will also be seen from a comparison between the operations *b* and *c* that in the case of *b* the content of $N_2$ in the reducing gas was lower by about 3.5%, the content of $N_2$ in the taken-out recycling gas was lower by about 14%, and the coke ratio was lower by 13 kg/T as compared with the case of *c*. This clearly shows the importance of controlling the value of $\theta$ within a range determined according to equation (6) and also controlling the values of *x* and *y* within the ranges respectively defined according to equations (7) and (8).

We claim:

1. In a method of blast furnace operation of the type in which a reducing gas produced by reforming a mixture of a peripheral gas stream taken out from the top or shaft portion of a blast furnace and a fresh feed materials is injected into the blast furnace through reducing gas inlet ports other than the ordinary tuyeres, wherein said peripheral gas stream is taken out through a plurality of outlet ports the improvement comprising determining the number of said outlet ports in accordance with either one of the following equations:

when $n \leq k\,m \geq \dfrac{C/H}{1.45(C/H)+2.7} n$ when $n > k\,m \geq \dfrac{C/H}{1.45(C/H)+2.7} k$ where $k = 75.2 - 268 \left(\dfrac{U}{U+V}\right) + 375 \left(\dfrac{U}{U+V}\right)^2 - 187 \left(\dfrac{U}{U+V}\right)^3$ $U/U+V$ = ratio of injected reducing gas quantity (U) to the total gas quantity (U+V) passing through furnace V = quantity of gas produced from the blast by the combustion of coke and solution loss reaction m = number of outlet ports for peripheral gas stream n = number of inlet ports for reducing gas C/H = ratio by weight of C to H contained in a fresh feed gas and positioning said outlet ports for peripheral gas stream relative to said inlet ports for reducing gas so that there is a predetermined angular relation therebetween established in accordance with the following equation:

$$\theta \leq \left| 2.52 \times 10^4 \left(\dfrac{U}{n(U+V)}\right)^3 - 4.53 \times 10^3 \left(\dfrac{U}{n(U+V)}\right)^2 + 2.83 \times 10^2 \left(\dfrac{U}{n(U+V)}\right) \right|$$

where $\theta$ = angle made between vertical plane formed by peripheral gas stream outlet port and furnace center line and vertical plane formed by reducing gas inlet port and furnace center line (in degrees)

n = number of reducing gas inlet ports

U = quantity of reducing gas injected

V = quantity of gas produced from blast by the combustion of coke and solution loss reaction 2. A method according to claim 1, including controlling the nitrogen content *x* (% $N_2$) of the gas taken out from the peripheral area of said furnace within a range established in accordance with the following equation:

$$-5 \leq x - \left\{72.2 \left(\dfrac{U}{U+V}\right)^2 - 116 \left(\dfrac{U}{U+V}\right) + 52\right\} \leq 5$$

where $0.1 \leq U/(U+V) \leq 0.9$ and controlling the nitrogen content *y* (% $N_2$) of the reducing gas to be injected within a range established in accordance with the following equation:

$$-5 \leq y - \left\{37.8 \left(\dfrac{U}{U+V}\right)^2 - 62.9 \left(\dfrac{U}{U+V}\right) + 32\right\} \leq 5$$

where $0.1 \leq U/(U+V) \leq 0.9$

* * * * *